Oct. 8, 1957
A. V. OSBORNE ET AL
2,808,657
JACKETED CONICAL DRYER
Filed April 14, 1955
4 Sheets-Sheet 1
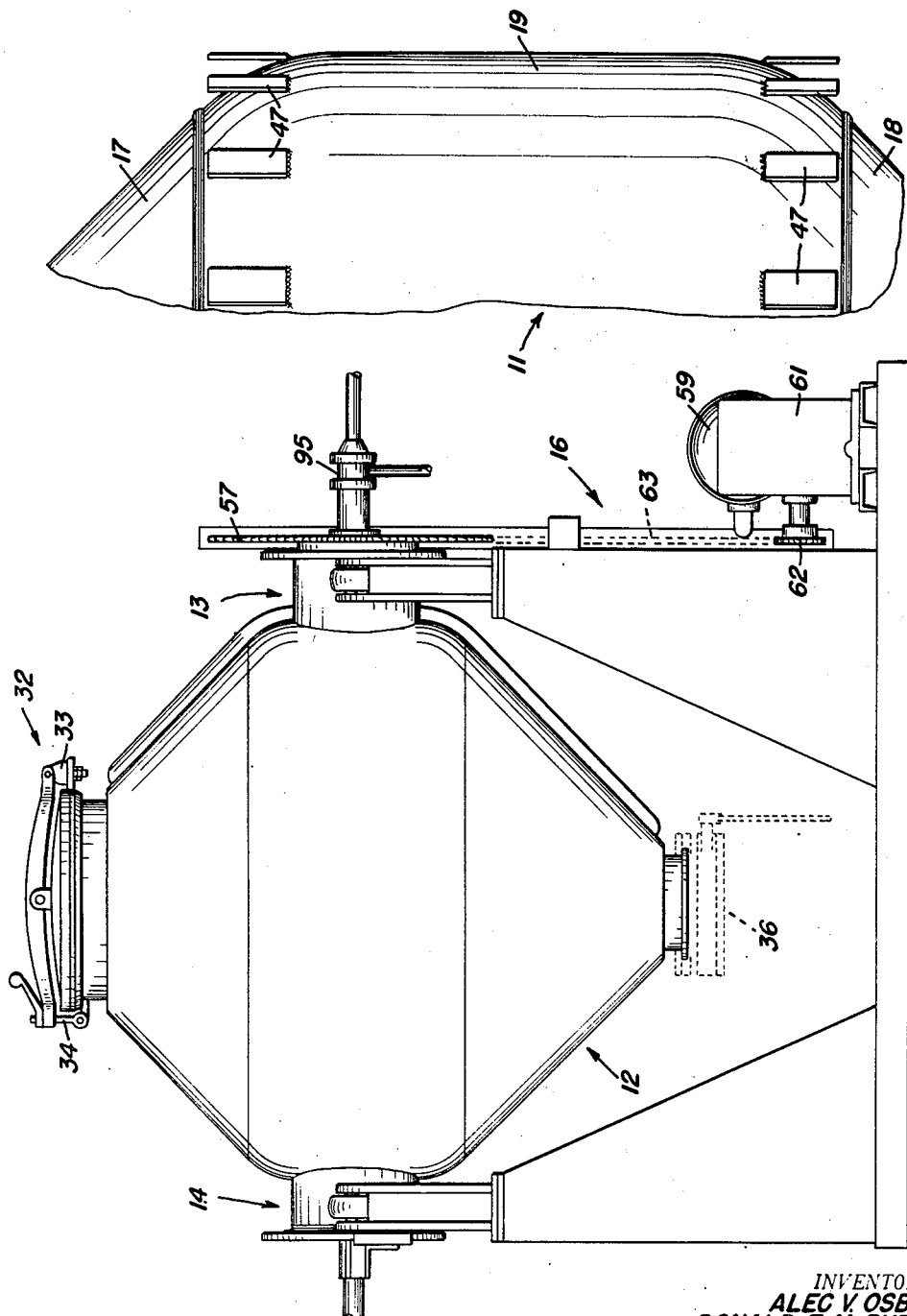
INVENTOR.
ALEC V. OSBORNE
AND DONALD F. McPHERSON
BY
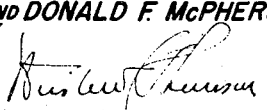
ATTORNEY

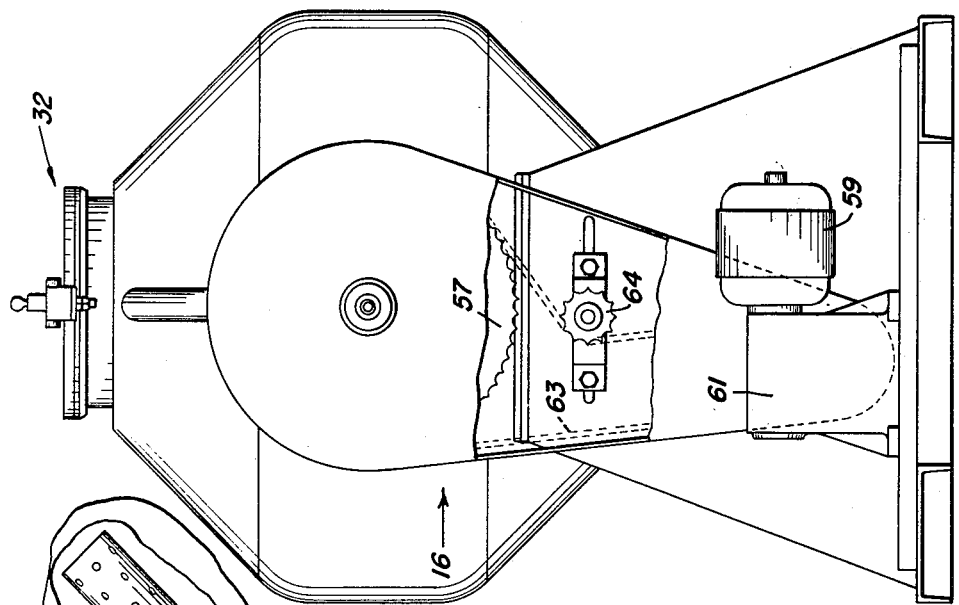
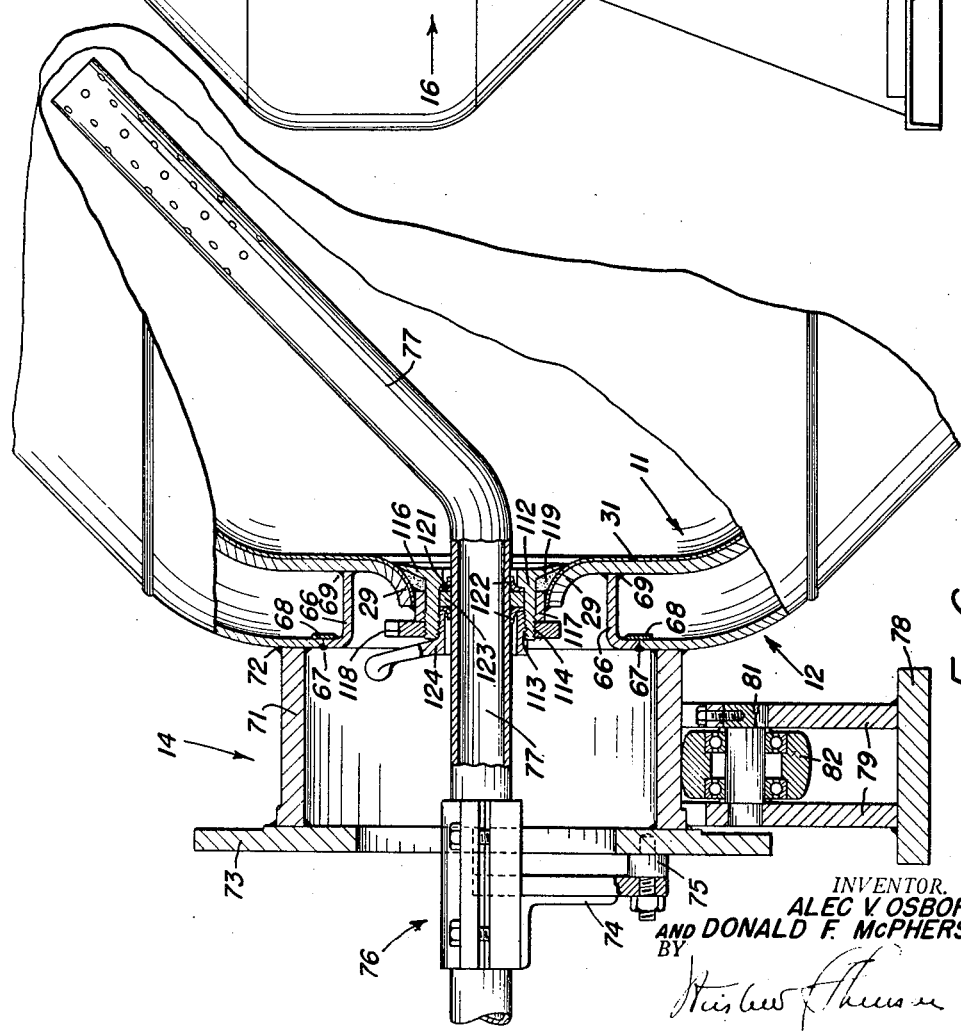

Oct. 8, 1957   A. V. OSBORNE ET AL   2,808,657
JACKETED CONICAL DRYER
Filed April 14, 1955   4 Sheets-Sheet 3

INVENTOR.
ALEC V. OSBORNE
AND DONALD F. McPHERSON
BY
ATTORNEY

Oct. 8, 1957 A. V. OSBORNE ET AL 2,808,657
JACKETED CONICAL DRYER
Filed April 14, 1955 4 Sheets-Sheet 4

INVENTOR.
ALEC V. OSBORNE
AND DONALD F. McPHERSON
BY

ATTORNEY

_United States Patent Office_

2,808,657
Patented Oct. 8, 1957

2,808,657

JACKETED CONICAL DRYER

Alec V. Osborne, Rochester, and Donald F. McPherson, Penfield, N. Y., assignors to The Pfaudler Company, Rochester, N. Y., a corporation of New York Application April 14, 1955, Serial No. 501,411

12 Claims. (Cl. 34—92)

Our invention relates to dryers, blenders or mixers of the jacketed conical type and a method of fabricating such blenders.

The blender or mixer which is the subject matter of this invention is useful for many purposes. For example, it may be employed to mix or blend two or more chemicals in a granulated, powdered or other somewhat finely divided state; heat or cool a chemical or mixture of chemicals which are in a relatively finely divided condition; dry a chemical or mixture of chemicals; or dry, blend and simultaneously heat or cool a mixture of chemicals in a relatively finely divided condition. In the preferred form of our invention, the interior of the blender is glass-coated, which coating resists the corrosive action of almost all chemicals but in connection with the fabrication of which and the sealing of an opening or openings into the interior thereof, special problems arise.

An object of the invention is to provide an improved method of fabricating a dryer, blender or mixer.

Another object of the invention is to provide an improved and simplified construction for the inlet and outlet to and from the jacket space of the dryer for the heat exchange medium.

Our invention further contemplates in a glass-coated dryer or blender, an improved construction for sealing the annular space around the vacuum tube of the dryer whereby to form a tight seal between the rotating dryer and the stationary vacuum tube and avoid injury to the glass-coated interior walls of the dryer shell.

To these and other ends the invention resides in certain improvements and combinations of parts, all as will be hereinafter more fully described, the novel features being pointed out in the claims at the end of the specification.

In the drawings:

Fig. 1 is a front elevational view of the dryer of our invention;

Fig. 2 is an end elevation of the same with parts broken away to show the drive mechanism;

Fig. 3 is a partial elevational view of the exterior wall of the dryer shell and indicating its method of fabrication;

Fig. 6 is a partial, vertical, sectional view showing the vacuum end of the dryer and showing the construction of the seal between the stationary vacuum tube and the rotating dryer;

Figure 4:
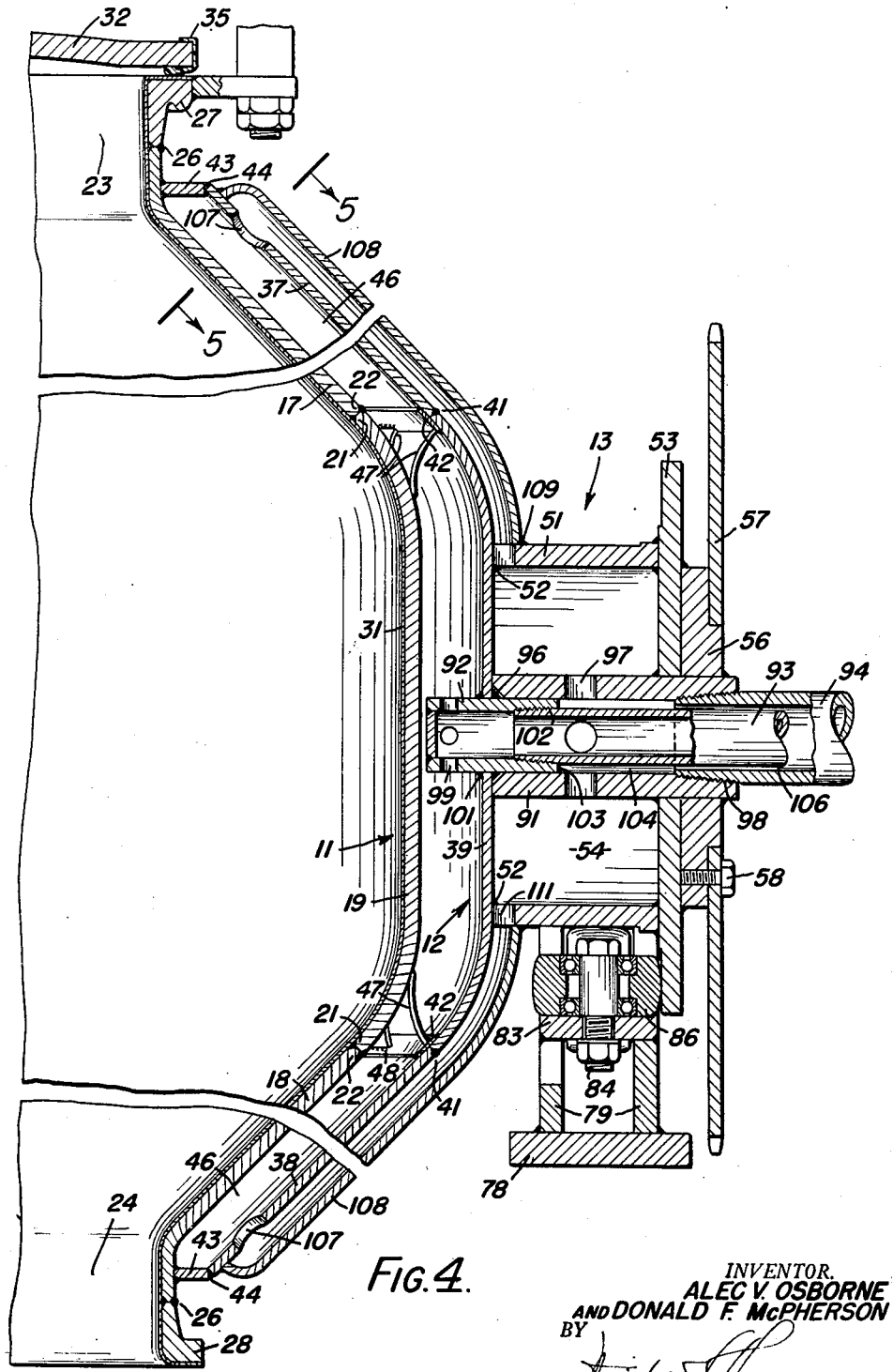
Fig. 4 is a vertical sectional view of one-half of the dryer and showing the trunnion construction and the arrangement of parts for circulating a heat exchange medium through the jacket space and also illustrating the method of fabrication of the dryer.
Figure 5:
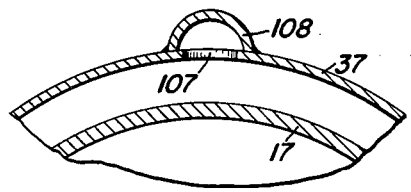
Fig. 5 is a sectional view taken substantially on the line 5—5 of Fig. 4 in the direction indicated by the arrows.
Figure 7:
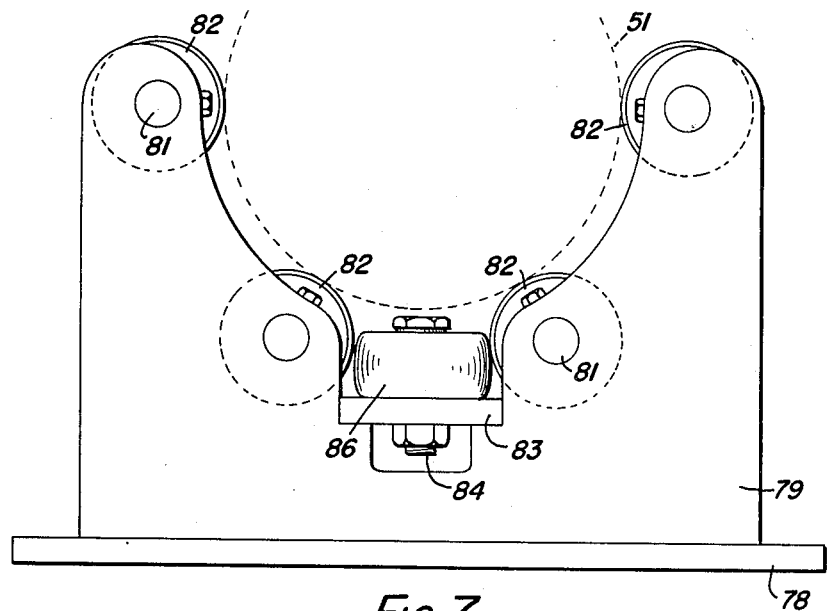
Fig. 7 is a vertical view showing a part of the trunnion assembly for supporting the dryer for rotation.
Figure 8:
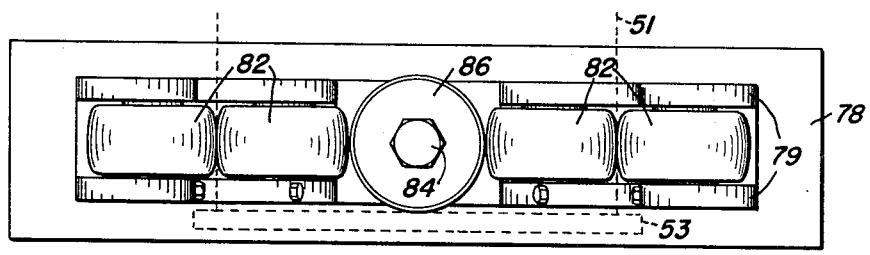
Fig. 8 is a top plan view of Fig. 7.

The dryer, blender or mixer of our invention comprises a dryer shell generally indicated by the numeral 11, a jacket, generally indicated by the numeral 12, a pair of trunnion assemblies generally indicated by the numeral 13 (Fig. 4) and 14 (Fig. 6) and a drive mechanism generally indicated by the numeral 16.

The blender shell, generally indicated by the numeral 11, comprises two essentially truncated cones 17 and 18 which are welded to an essentially cylindrical part 19 as indicated at 21. The joints at the exterior of the shell are also welded as indicated at 22. Each end of the shell thus far described is open to provide a combined inlet and manhole opening 23 and a discharge opening 24. Welded, as indicated at 26, interiorly and exteriorly to each of the openings 23 and 24 are nozzles 27 and 28.

The central part 19 of the shell has one or more central openings; in this case, one (Fig. 6), the margins of which are flared outward as shown at 29. After the shell has been fabricated as aforesaid, the interior shell walls at the welds 21 and 26 are ground so that they are essentially flush with the adjacent sidewalls. After the welds have been ground to provide a smooth interior, the entire interior surface of the dryer shell including the nozzles 27 and 28 and the interior portions of the flared out part 29, are glass-coated as indicated at 31.

The filling opening is closed by a cover assembly generally indicated by the numeral 32, which constitutes no part of the present invention and need not be described in detail. It is sufficient to state that the cover assembly (Fig. 1) includes a cover 32, a suitable hinge 33 for the cover, a suitable swing bolt mechanism indicated by the numeral 34 for locking the cover in closed position and a suitable gasket indicated by the numeral 36 (Fig. 4) upon which the cover seals.

The closure for the discharge opening 24 also constitutes no part of the present invention and has been indicated only in dotted lines by the numeral 36. It is sufficient to state that the structure at the discharge opening comprises a discharge valve and a support therefor carried by the nozzle 28.

The jacket generally indicated by the numeral 12, comprises two frusto-conical parts 37 and 38 which are secured to an essentially cylindrical central part 39. The frusto-conical parts 37 and 38 are joined to the central part 39 by welds 41 and internally of the jacket adjacent the joints, a pair of annular metal bands 42 are welded for the purpose of backing up the welded joints. Two annular rings 43 are welded to the exterior of the dryer shell 11 and the jacket 12 is welded to these annular rings, as shown at 44, thus placing the jacket in spaced relation to the wall of the dryer shell to provide a jacket space 46 through which a heat exchange medium may be circulated as will presently appear.

Welded to the exterior of the dryer shell 11 is a plurality of somewhat flexible strengthening elements 47 which are welded at spaced intervals around the shell to the exterior of the central part 19 thereof. When the jacket is applied to the dryer shell, these strengthening elements 47 are bent and welded to the interior of the jacket as shown at 48. Preferably these welds are made to the annular band 42. The jacket and dryer shell are thus held substantially rigidly in spaced relation, yet with enough flexing action to prevent damage to the glassed dryer shell 11. The flexible strengthening elements 47 thus minimize the transmittal of a blow on the exterior of the jacket to the interior of the mixer shell likely to crack the glass coating.

The driving trunnion 13 through which the heat exchange medium is admitted and exhausted comprises a cylindrical member 51 which is welded to the outer wall of the jacket as shown at 52. A large diameter plate 53 is welded to the cylindrical member 51 and defines, together with jacket wall and the cylindrical member 51, a housing having a chamber 54. A second plate 56 is welded to the plate 53 and has a portion of reduced diameter forming a shoulder upon which a sprocket is mounted and to which it is rigidly secured as shown at 58.

As shown most clearly in Fig. 2, the gear or sprocket 57 is driven from an electric motor 59 which drives a speed reducer 61 which carries a sprocket 62 (Fig. 1). A chain 63 passes over the sprockets 57 and 62 and rotates the dryer at a considerably reduced speed with respect to the speed of the motor. A chain tightener indicated by the numeral 64, may be provided if desired.

Referring now to Fig. 6, at the vacuum end of the dryer, the jacket is provided with an enlarged opening to which an essentially cylindrical member 66 is welded as shown at 67, an annular ring 68 being welded internally at the joint for strengthening purposes. The cylindrical member is welded to the dryer shell as shown at 69.

The vacuum end trunnion generally indicated by the numeral 14 includes a cylindrical member 71 welded to the outer wall of the jacket as shown at 72. An annular plate 73 is welded to the cylindrical member 71. An angle iron 74 is supported in a resilient manner with rubber or suitable mounts 75 from the frame of the trunnion support to be described. This angle iron 74 supports a clamp assembly, generally indicated by the numeral 76, through which the vacuum tube 77 extends. It will be understood that the vacuum tube 77 and clamp 76 are stationary and the trunnion assembly 14 rotates with the dryer.

The dryer is mounted on two base plates 78 which have four trunnion plates 79 extending vertically therefrom and rigidly secured thereto. The trunnion plates 79 are mounted in pairs on each side of the machine and support the shafts 81 of ball-bearing mounted rollers 82. The rollers 82 ride on and support the exterior surfaces of the cylindrical members 51 and 71. Extending between each pair of trunnion plates 79, as shown most clearly in Fig. 4, is a supporting plate 83 in which a stub shaft 84 is fastened. A ball-bearing mounted roller 86 is mounted on each of the stub shafts and bears against the plates 53 and 73 to reduce side thrust which may be caused by the machine not being level across the trunnions.

The means for circulating a heat exchange medium, whether it be a cooling liquid or a heating medium such as steam through the jacket space 46 is shown in Fig. 4. The means for circulating a heat exchange medium includes an outlet fitting 91, an inlet fitting 92 and inlet and outlet pipes 93 and 94 respectively. The outlet fitting 91 extends through openings formed in the plates 53 and 56 to which it is welded as shown. The outlet fitting 91 has a plurality of radial openings 97 and is threaded at its outer end as shown at 98 for the reception of the outlet pipe 94.

The inlet fitting 92 projects through an opening in the jacket wall 39 and the projecting end is provided with a plurality of radial openings 99. The inlet fitting 92 is welded to the inner wall of the jacket, as shown at 101, and is welded to the outer wall of the jacket and to the outlet fitting through the weld 96. The outer end of the inlet fitting is threaded at 102 to receive the threaded inner end of the inlet pipe 93. The inlet fitting 92 terminates short of the openings 97 in the outlet fitting, as shown at 103, whereby an annular space 104 is provided for the exhaust heat exchange medium which from the annular space 104 flows through an annular space 106 between the inlet pipe 93 and the outlet pipe 94.

The walls 37 and 38 of the jacket 12 each have an opening 107 which discharges into a conduit 108 welded to the jacket outer sidewall. Conduits 108 are carried down to the cylindrical member 51 where they are welded as shown at 109. The walls of the cylindrical member 51 have openings 111 which open into the chamber 54.

It will now be apparent that steam or any other heat exchange medium enters through the inlet pipe 93 from a rotary pressure joint 95 (Fig. 1), the construction of which is well known in the art to which this invention applies. From the inlet pipe, the heat exchange medium flows through the inlet fitting 92, out through the radial passages 99 and into the jacket space 46. Since the outlets for the steam for the jacket space is adjacent the top and bottom of the mixer or dryer, the steam tends to flow around the outer wall of the dryer shell through the jacket space so as substantially to entirely fill the jacket space before reaching the outlets 107. From thence the steam flows through the conduits 108; the openings or ports 111 into the chamber 54. From the chamber 54, the steam flows through the radial openings 97 in the outlet fitting 91, through the annular spaces 104 and 106 to the outlet pipe 94 and from thence to the rotary pressure joint 95.

It will be apparent from the foregoing that the inlet and outlet fittings together with the inlet and outlet pipes constitute a unitary compact assembly.

One of the important aspects of our invention is the means employed for sealing the annular space around the vacuum tube 77 without damaging the glass-coated inner wall of the blender shell at 29. This assembly comprises a stuffing box body 112 which is threaded internally and externally as shown at 113 and 114.

The stuffing box body has a cylindrical portion which terminates inside the dryer in a sealing ring 116. The sealing ring is somewhat frusto-conical in shape and terminates adjacent its margins in an annularly extending feather edge adapted to engage the adjacent glassed portion of the shell. It will be particularly noted that the sealing ring extends essentially tangential to the adjacent curved wall 29 of the shell.

A collar 117 extends around the stuffing box body 112 and a nut 118 is drawn up on the exterior of the body. Sealing compound 119 of deformable character at least when applied and impervious to corrosion by most chemicals is fitted into the space between the collar 117 and the sealing ring 116. Upon tightening the nut, the sealing compound fills all voids and tends to squeeze between the feather edge and the adjacent glass wall. The tangential relationship of the sealing ring and the adjacent curved glass wall causes a sliding action when the nut 118 is drawn up which, together with the sealing compound, protects the glass coating.

Internally the stuffing box body 112 has a shoulder 121 which forms a seat for a pair of packing rings 122 of "Teflon" or other suitable material which are spaced from each other by an annular spacing ring 123. A stuffing box packing nut 124 is threaded internally into the stuffing box body; and when drawn up, presses the packing rings into sealing relationship with the adjacent parts. The flexible packing rings 122 in conjunction with the resilient mounting of the vacuum tube 77 will provide a positive seal independent of any misalignment of the parts involved.

While we have shown and described the preferred form of our invention and have described the preferred method of fabricating the dryer, it will be apparent that various changes may be made therein, particularly in the form and relationship of parts without departing from the spirit of our invention as set forth in the appended claims.

We claim:

1. A dryer comprising, in combination, a dryer shell having an inlet and an outlet for the material to be mixed, a jacket substantially wholly enclosing said shell and defining a space between the shell and the jacket for the circulation of a heat exchange medium, a conduit secured to the external wall of said jacket, trunnion assemblies upon which said shell is mounted for rotation about an axis one of said trunnion assemblies including a housing, inlet and outlet pipes extending along said axis of rotation, and means enabling circulation of said heat exchange through a circulation circuit defined by said inlet pipe, said jacket space, said conduit, said trunnion housing and said outlet pipe.

2. A dryer in accordance with claim 1 in which said housing comprises a cylindrical member concentric with the axis of rotation defining an outlet fitting and a cylindrical wall concentric with said cylindrical member, said cylindrical wall and cylindrical member having openings enabling circulation of the heat exchange medium from the conduit to the interior of said outlet fitting through said housing.

3. An assembly for a dryer comprising an inlet fitting having a partially threaded bore, an inlet pipe threaded into said inlet fitting, an outlet fitting having a partly threaded bore, and being externally concentric with said inlet fitting and inlet pipe, an outlet pipe threaded into said outlet fitting in spaced concentric relation to said inlet pipe, said outlet fitting and inlet pipe being in spaced relation and means enabling circulation of a heat exchange medium through said inlet fitting then in heat exchange relation to the dryer and from thence to the interior of the outlet fitting through said spaces to the outlet pipe.

4. An assembly in accordance with claim 3 in which the circulation circuit for the heat exchange medium includes a jacket extending around the dryer and an outlet conduit welded to the exterior of the jacket which connects with said outlet fitting.

5. A dryer comprising a glass lined shell having an opening along an axis of rotation, a stationary vacuum pipe extending through said opening into the interior of the dryer, means for sealing the space between the glass coated margins of said opening and the exterior of said vacuum pipe comprising a stuffing box body having an externally threaded portion at one end thereof, a sealing ring at the other end of said stuffing box body adapted to engage the glass coating, a collar extending around said stuffing box body, a nut threaded on said stuffing box body and a displaceable sealing compound between said sealing ring and said collar whereby when pressure is applied on said nut the sealing compound is displaced and compressed into any void space existent whereby sealing is effected primarily by said sealing compound and injury to the glass coating is avoided.

6. A dryer in accordance with claim 5 wherein an annular space exists between the exterior of the vacuum pipe and the interior of the stuffing box body and the structure includes a shoulder on the interior of said stuffing box body, a stuffing box packing nut, and packing means adapted to be pressed against said shoulder by said stuffing box packing nut.

7. A dryer comprising, in combination, a shell having a vacuum pipe opening, a pair of trunnion assemblies upon which said shell is rotated, a stationary vacuum pipe extending through said opening, means for sealing the space between said stationary vacuum pipe and the rotating parts of said shell comprising flexible sealing means, means including a clamp for rigidly supporting said vacuum pipe and resilient means between said supporting means and the adjacent trunnion assembly, said flexible sealing means and said resilient means cooperating to allow for misalignment of the shell opening, the vacuum pipe and the trunnion assemblies.

8. A dryer comprising, in combination, a dryer shell, a jacket substantially wholly enclosing said shell and defining a jacket space between the shell and the jacket for the circulation of a heat exchange medium, said jacket having an opening substantially concentric with the axis of rotation of the dryer, an inlet fitting having a partially threaded bore carried in the margins of said opening and communicating with said jacket space, an inlet pipe for the heat exchange medium threaded into said inlet fitting, an outlet fitting communicating with said jacket space and having a partly threaded bore externally concentric with said inlet fitting and inlet pipe and an outlet pipe threaded into said outlet fitting in spaced concentric relation to said inlet pipe, said outlet fitting and inlet pipe being in spaced relation, the spaced relationships of said outlet fitting and outlet pipe with respect to said inlet pipe defining an annular discharge outlet for the heat exchange medium.

9. A dryer in accordance with claim 8 in which communication between the outlet fitting and the jacket space is provided by a housing surrounding said outlet fitting, a conduit between said jacket space and said housing and openings in the outlet fitting communicating with the housing.

10. A dryer comprising, in combination, a rotatable shell having an opening along an axis of rotation, a stationary vacuum pipe in spaced relation to the margins of said opening extending through said opening into the interior of the dryer, the margins of said opening being joined to the interior walls of the shell by a substantially continuously curved outwardly flaring surface and the interior walls of the shell and said curved surface to said margins being glass coated, means for sealing the space between the glass coated margins of said opening and the exterior of said vacuum pipe comprising a stuffing box body having an enlarged circular part interiorly of the margins of said opening, said enlarged part having a portion thereof extending tangentially with respect to said curved surface, a deformable sealing compound exteriorly of said enlarged circular part and means for applying pressure on said sealing compound in a direction toward said enlarged circular part to eliminate voids in the sealing compound and form a seal between said tangential part and said curved glass surface.

11. A dryer in accordance with claim 10 in which said last mentioned means includes a threaded part on the stuffing box body and a nut through which pressure is applied on said sealing compound.

12. A dryer in accordance with claim 10 in which the interior of the stuffing box body has a shoulder and the structure includes a stuffing box packing nut and packing means are provided adapted to be pressed against said shoulder by said stuffing box packing nut.

References Cited in the file of this patent

UNITED STATES PATENTS 2,616,163     Schmitz et al.  _____ Nov. 4, 1952

FOREIGN PATENTS 445,828     Great Britain _____ Apr. 20, 1936